United States Patent [19]

Sedziak

[11] 4,023,770
[45] May 17, 1977

[54] INJECTION MOLDING DIE SYSTEM

[75] Inventor: Anthony Z. Sedziak, Erie, Pa.

[73] Assignee: Penn-Erie Manufacturing Company, Erie, Pa.

[22] Filed: Aug. 26, 1976

[21] Appl. No.: 717,917

[52] U.S. Cl. .............................. 249/107; 249/110; 425/247; 425/250

[51] Int. Cl.² .......................................... B22C 9/20

[58] Field of Search .......... 425/250, 247, 248, 245; 249/107, 110, 126; 222/330, 526, 527, 533

[56] References Cited

UNITED STATES PATENTS

| 2,509,120 | 5/1950 | Warren | 222/526 X |
| 3,718,166 | 2/1973 | Gordon | 425/247 X |
| 3,723,040 | 3/1973 | Rees | 425/245 |
| 3,861,841 | 1/1975 | Hanning | 425/248 X |

FOREIGN PATENTS OR APPLICATIONS

| 17,582 | 1967 | Japan | 425/247 |
| 356,872 | 10/1961 | Switzerland | 425/247 |

Primary Examiner—Francis S. Husar
Assistant Examiner—William R. Briggs

[57] ABSTRACT

A transfer structure for a stacked injection molding die comprising:

Two transfer tubes connected to a stack molding die and connected together by a knuckle joint so that molten plastic can flow from the runner in one of the parts of the stack molding die through the transfer tubes to the other dies, yet allow the die members to move freely toward and away from each other.

6 Claims, 9 Drawing Figures

INJECTION MOLDING DIE SYSTEM

REFERENCE TO PRIOR ART

The transfer system described herein is intended to solve the problems of multiple layer cavities referred to in: U.S. Pat. Nos. 2,571,766; 3,723,040; 3,843,294; and constitutes an improvement over these patents.

OBJECTS OF THE INVENTION

It is an object of the invention to provide an improved injection molding die transfer system for use with stacked molds.

Another object of the invention is to provide a transfer system for injection molding dies that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

DETAILED DESCRIPTION OF DRAWINGS

Figure 1:
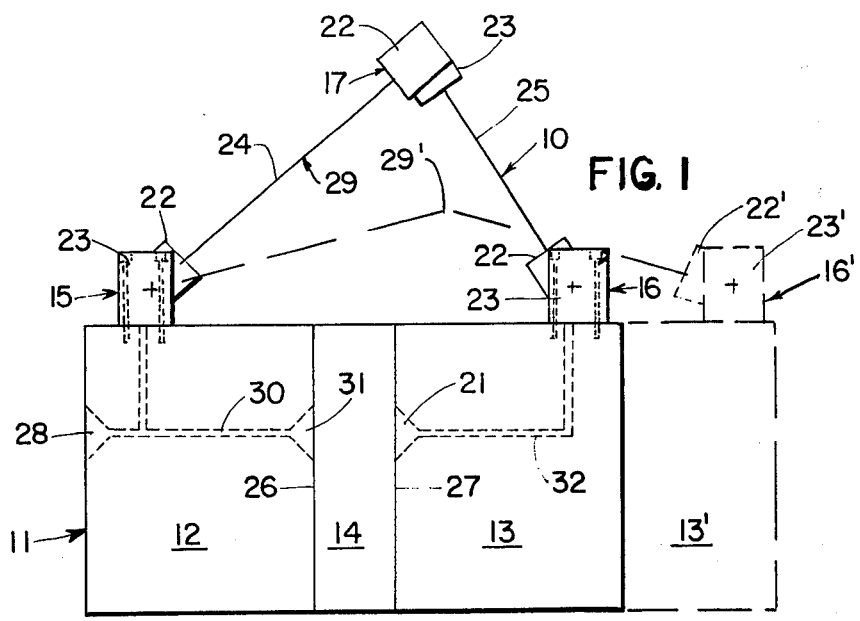
FIG. 1 is a schematic view of the transfer system according to the invention shown on a stacked mold.
Figure 2:
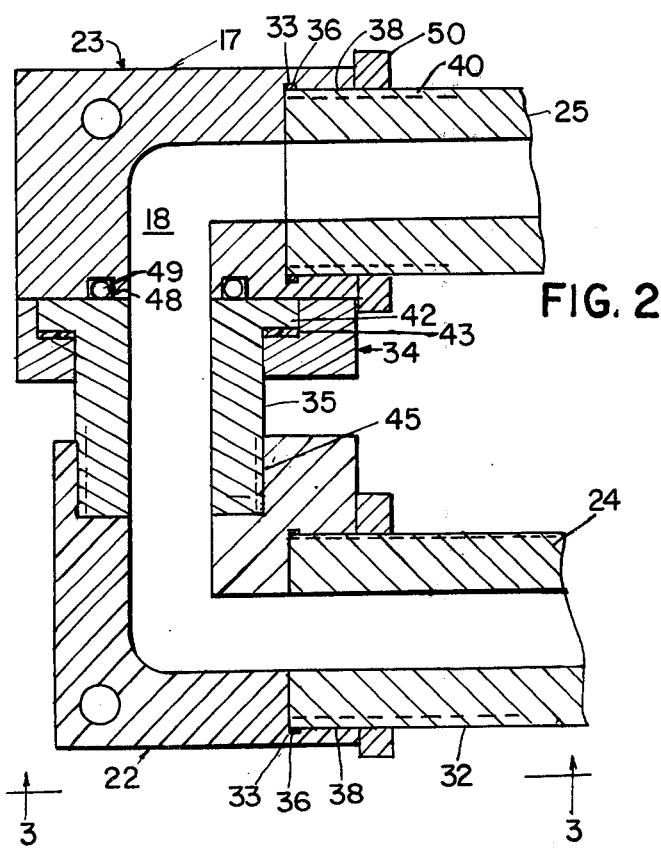
FIG. 2 is a cross-sectional view taken through the center pivot blocks shown in FIG. 1.
Figure 3:
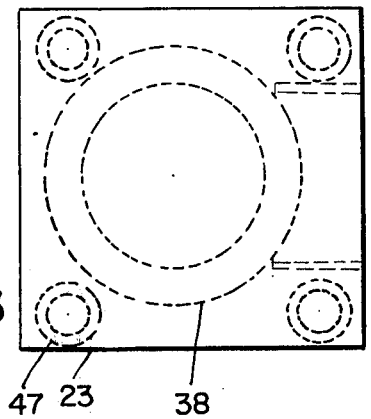
FIG. 3 is a side view of one of the center pivot blocks.
Figure 4:
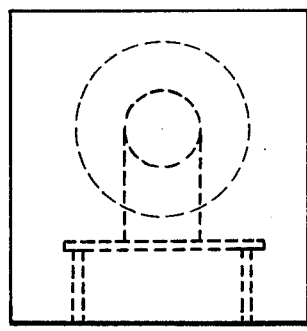
FIG. 4 is a front view of one of the elbow blocks.
Figure 5:
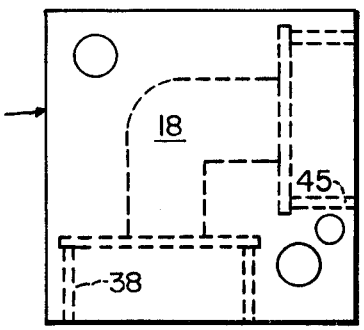
FIG. 5 is a view of the elbow block taken at a right angle to FIG. 4.
Figure 6:
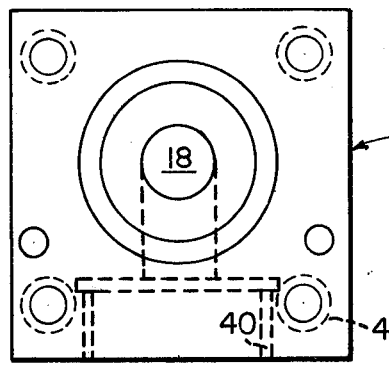
FIG. 6 is a top view of a pivot elbow.
Figure 7:
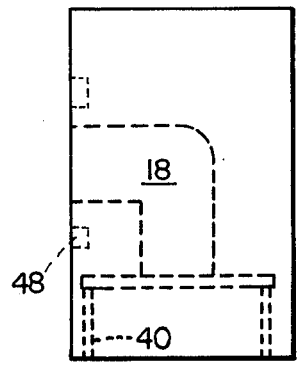
FIG. 7 is a side view of the pivot elbow shown in FIG. 6.
Figure 8:
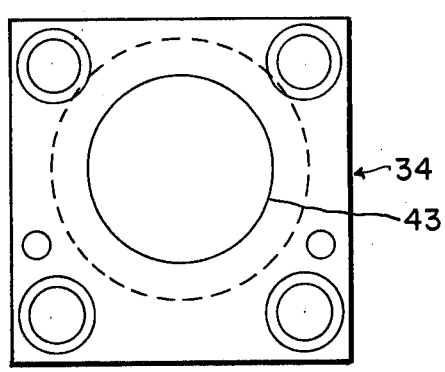
FIG. 8 is a top view of a cap block.
Figure 9:
FIG. 9 is a side view of the cap block shown in FIG. 8.

The transfer system 10 according to the invention is shown in FIG. 1 supported on a stacked injection mold 11 made up of mold sections 12, 13 and 14 for use on an injection molding machine of a type familiar to those skilled in the art. The three sections 12, 13 and 14 are separable along parting lines 26 and 27 in a conventional manner. A recess 28 is provided in mold 12 for receiving the injection nozzle to direct molten material through runner 30 to cavity 31 and through transfer system 29 to runner 32 to cavity 21 in mold section 13.

The transfer system 29 consists of transfer tubes 24 and 25 which are swingably connected to the mold sections 12 and 13 respectively by knuckle joints 15 and 16. The transfer tubes 24 and 25 are swingably connected to each other by knuckle joint 17. Molten material enters the transfer system from runner 30 where it passes through passage 18 through the knuckle joint 15 and into the transfer tube 24. It then passes through knuckle joint 17 into transfer tube 25, and through knuckle joint 16 which directs the flow into the runner 32.

Each of the knuckle joints 15, 16 and 17 are made up of an elbow block 22, a pivot block 23 connected together by a nipple 35 which is rotatably supported on the elbow block 22 by means of the pivot cap block 34 and is threadably received in elbow block 23.

The operation of the knuckle joint 17 is accomplished as follows: Elbow block 22 threadably receives the end 32 of tube 24. The pivot block 23 threadably receives the threaded end 40 of the transfer tube 25 and redirects the flow of molten material into the transfer tube 25. The first knuckle joint 15 is likewise made up of an elbow block 22 which is fixed to the mold section 12 by means of cap screws and a pivot block 23 is swingably connected to the pivot block which threadably receives the end of the transfer tube 24. In like manner, the knuckle joint 16 is made up of an elbow block fixed to the mold section 13 and swingably connected to a pivot block 23 by means of a nipple 35. The transfer tube 25 is threadably connected to the pivot elbow 23. Jam nuts 50 hold threads 40 tight.

Each pivot block 23 is swingably connected to its elbow block 22 by means of the pivot cap 34 which has a counterbore in it that receives the flange 42 of the nipple 35. The nipple 35 is threadably received in the counterbore 45 in the elbow block 22. The washer 43 which may be made of teflon or other resistant material is supported under the flange 42 of the nipple 35 and provides both a seal and a bearing.

To provide a seal at the inner end of each transfer tube, a teflon washer 33 is received in the groove 36 consenting to the bore 38. This teflon washer is threadably received on the sealing material and is provided in the undercut groove 36 at the inner end of each transfer tube.

The pivot block 23 redirects the flow of molten material through passage 18 into the nipple 35. Nipple 35 is threadably attached to elbow block 22 and is swingably connected to pivot block 23 by pivot cap block 34.

Thus, to open the mold 11, the mold sections 13 and 14 can be moved to the dashed line position 13' in order to remove the parts from the cavity 21 and 31. In so moving, each of the pivot blocks 23 swing relative to the elbow blocks 22.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A linkage transfer system for a stacked injection mold comprising,
    an injection mold having at least a first mold part and a second mold part each having a cavity therein,
    means on one of said mold parts for connecting a dispensing nozzle of an injection molding machine to one said mold part,
    a first transfer tube and a second transfer tube,
    a knuckle joint pivotably connecting said first transfer tube to said second transfer tube,
    a second knuckle joint pivotally connecting said first transfer tube to said first mold part,
    a third knuckle joint pivotally connecting said second transfer tube to said second mold part, said transfer tubes and said joints defining a portion of an injected material path from said means to said cavities said first mold part and second mold part being movable laterally relative to each other to thereby swing said transfer tubes relative to each other.

2. The linkage transfer system recited in claim 1 wherein said first mold part has a first runner connecting said first cavity to said first transfer tube and said second mold part has a second runner connection said second cavity to said second transfer tube whereby molten plastic material can flow from said nozzle to both said first runner and to said second runner.

3. The linkage transfer system recited in claim 1 wherein said knuckle joint comprises,
 a pivot block attached to each said mold part and a pivot elbow attached to said transfer tube and nipple means connecting each said pivot elbow to said pivot block.

4. The linkage transfer system recited in claim 3 wherein nipple means connects said pivot blocks to said pivot elbows and,
 said nipple means has one end fixed to said pivot elbow and the other end having a flange thereon and a bored block receiving said flange holding said flange concealed engagement with said pivot elbow.

5. The linkage transfer system recited in claim 4 wherein said transfer tubes are threadably connected to said pivot elbows.

6. The linkage transfer system recited in claim 1 wherein said pivotal connections of said transfer tubes to said mold parts comprises,
 a pivot block connected to each said mold part, connecting said transfer tubes to each other each comprise and a pivot elbow connected to each said transfer tubes and nipple means connecting each said pivot block to a said transfer tube.

* * * * *